Dec. 1, 1953     M. H. THORNTON     2,660,728
GLARE-SHIELDING DEVICE
Filed Dec. 13, 1951     2 Sheets-Sheet 1
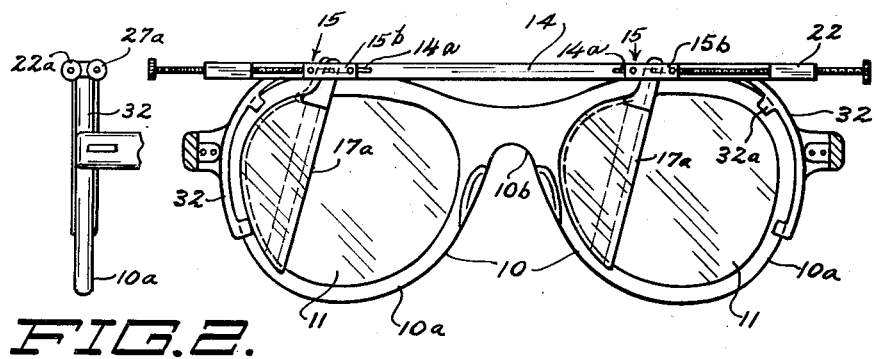
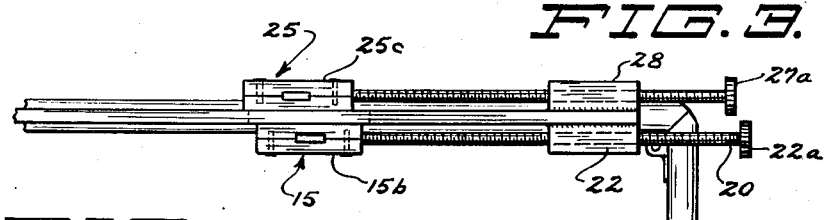
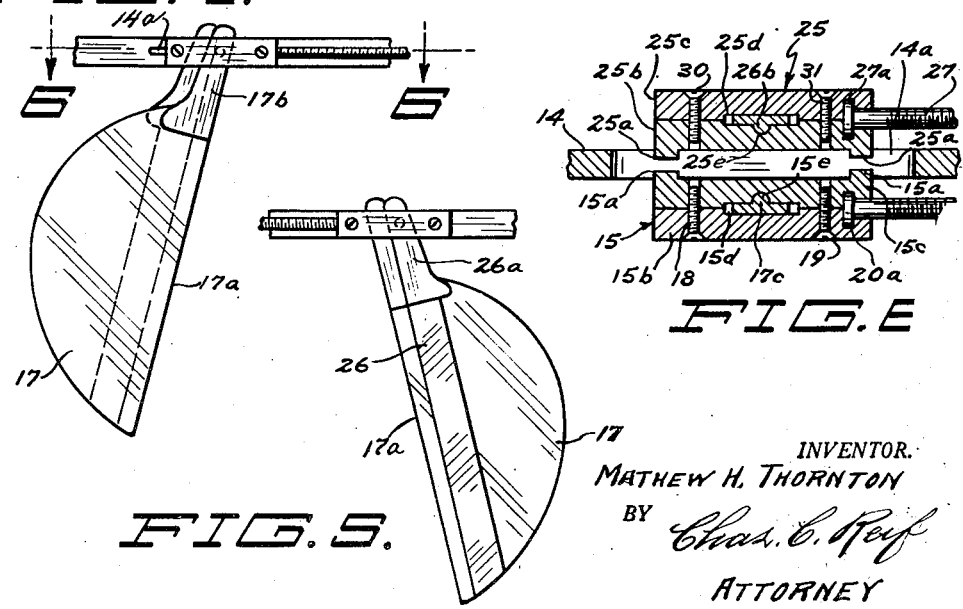
INVENTOR.
MATHEW H. THORNTON
BY Chas. E. Reyf
ATTORNEY Dec. 1, 1953 M. H. THORNTON 2,660,728
GLARE-SHIELDING DEVICE
Filed Dec. 13, 1951 2 Sheets-Sheet 2
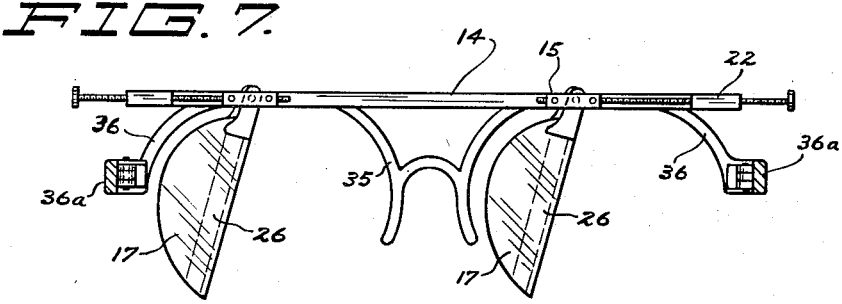
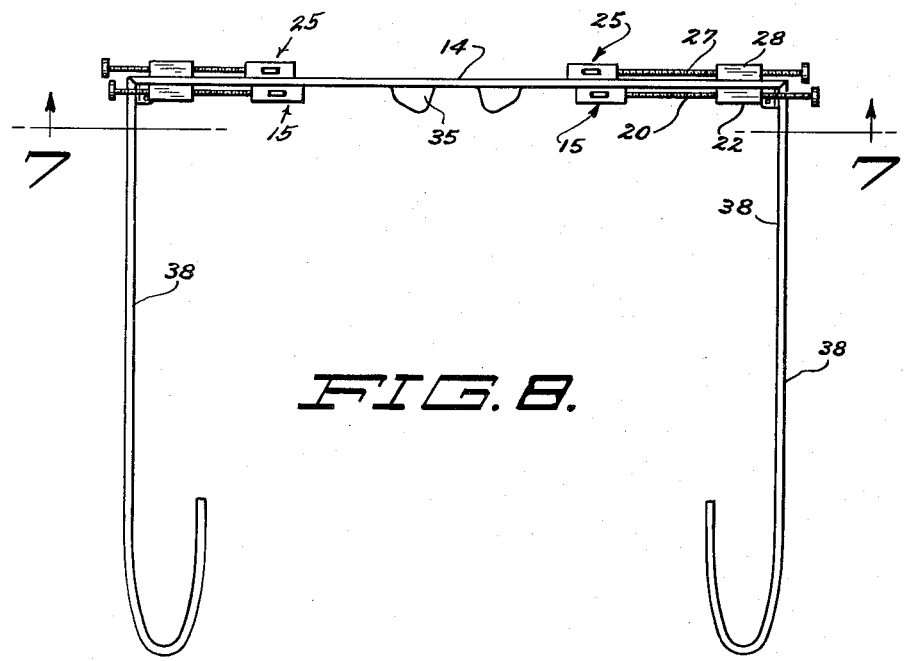
INVENTOR.
MATHEW H. THORNTON
BY
ATTORNEY Patented Dec. 1, 1953

2,660,728

UNITED STATES PATENT OFFICE 2,660,728

GLARE-SHIELDING DEVICE

Mathew H. Thornton, St. Paul, Minn.

Application December 13, 1951, Serial No. 261,525

13 Claims. (Cl. 2—14)

This invention relates to a device for shielding the eyes of the driver of an automobile from the glare of the headlights of an approaching automobile. As is well known, there is a strong and objectionable glare from the headlights of an approaching automobile, particularly when the headlights of said automobile are set to project the light some distance in front of the automobile.

It is an object of this invention to provide a device comprising a portion of semi-transparent sheet material which will be supported in front of one or both eyes of the driver, the same being of a size to vary the vision of the driver on only the left-hand side of the road so that the right-hand side of the road can be observed as usual, said device being preferably of segmental form and having a straight edge at the right-hand side thereof.

It is another object of the invention to provide such a device as set forth in the preceding paragraph, together with a second member of semi-transparent sheet material and preferably of bar-like form with a small transverse dimension, the same being spaced from said first mentioned member a short distance in a direction normal to the plane of said first mentioned member, said second member having a straight edge at its right-hand side, said members being relatively movable to bring the straight edges thereof into the desired positions to give a sharp dividing line in the wearer's vision.

It is a further object of the invention to provide a device having a set of said members set forth in the preceding paragraph disposed respectively in front of each eye of the wearer.

It is more specifically an object of this invention to provide a device comprising an elongated supporting member, members spaced longitudinally thereof and arranged for sliding movement longitudinally thereof, means on said supporting member for moving said last mentioned members longitudinally thereof, a member of semi-transparent sheet material pivotally connected to each of said first mentioned members to be swingable about an axis substantially perpendicular to their respective planes, said semi-transparent members each being of substantially segmental form and having a straight edge at the right side thereof, and means for supporting said supporting member upon the wearer with said second members respectively disposed in front of the eyes of the wearer and at the left-hand portion of each eye.

It is still another object of the invention to provide such a device as set forth in the preceding paragraph with another pair of members spaced longitudinally of said supporting member and slidable longitudinally thereof, together with an elongated member of small transverse dimension made of semi-transparent sheet material pivotally connected at one end to each of said last mentioned members for swinging movement about an axis substantially perpendicular to the respective planes of said last mentioned members, said last mentioned members being spaced from said first mentioned semi-transparent members in a direction extending perpendicular to the plane thereof, said last mentioned members being disposed adjacent the straight edges of said first mentioned transparent members.

These and other objects and advantages of the invention will be fully set forth in the following description made in connection with the accompanying drawings in which like reference characters refer to similar parts throughout the several views and in which:

Fig. 1 is a view in front elevation of one form of the device looking forwardly through the spectacles shown;

Fig. 2 is a partial view in end elevation as seen from the left-hand end of the device;

Fig. 3 is a partial top plan view;

Fig. 4 is a partial view in front elevation;

Fig. 5 is a partial view in rear elevation;

Fig. 6 is a horizontal section taken on line 6—6 of Fig. 4, as indicated by the arrows;

Fig. 7 is a view in front elevation of a modified form of the device, some parts being shown in vertical section; and Fig. 8 is a top plan view of the device shown in Fig. 7.

Referring to the drawings, particularly Figs. 1 to 6, a device is shown adapted to be carried on a pair of spectacles 10 having the usual eye glass portions 10a, the nosepiece 10b and the lenses 11.

A device is shown comprising a supporting member 14, and while this could take various forms, in the embodiment of the invention illustrated it is shown as an elongated bar of rectangular form in cross section. Member 14 has extending horizontally therethrough at spaced points, slots 14a. Spaced members 15 are disposed at one side of bar 14, said members engaging the side of said bar and having projections 15a at their ends extending into slots 14a and forming guide means for members 15. Members 15 are each composed of portions 15b and 15c divided along a vertical plane. The portions 15b and 15c adjacent their longitudinal midpoints each have a shallow recess 15d formed therein, which recesses are in alignment and extend vertically through the portions 15b and 15c. Members 17 are provided, made of semi-transparent sheet material such as colored glass or Celluloid, and members 17 are shown as of general segmental form thus having a straight edge 17a at one side. As shown in Figs. 1 and 4, the straight edge 17a is at the right-hand side of members 17. Members 17 have portions 17b at their upper ends which may be of metal secured in any suitable manner to members 17, and members 17b extend into the recesses 15d. Members 17b are provided with small cylindrical projections 17c which fit into similarly shaped recesses 15e formed in the portions 15c. The portions 15b and 15c are connected by a pair of screws 18 and 19 extending through portions 15b and threaded into portions 15c. Said screws are shown as having counter-sunk heads. Members 17 can be swung in their planes about the axes of portions 15e.

The portions 15b and 15c are also provided with mating recesses adapted to receive the ends respectively of screws 20, said ends having enlarged cylindrical portions 20a thereon. Screws 20 extend through members 22 which are rigid with bar 14 and disposed at the ends of said bar. Screws 20 are threaded in the members 22 and have small hand wheels 22a at their outer ends. It will be seen that by turning the wheels 22a that screws 20 will move in the portions 22 and will move member 15 longitudinally of bar 14.

A member 25 similar to member 15 is disposed at the opposite or front side of bar 14, the same being divided along a vertical plane to form portions 25b and 25c, the portions 25b having projections 25a at its ends fitting in slot 14a. Portions 25b and 25c have mating recesses 25d adjacent their central portions which extend vertically through portions 25b and 25c. Members 26 are provided made of semi-transparent sheet material such as colored glass or Celluloid and said members are shown as of bar-like form having a small transverse dimension and substantially parallel straight sides. Members 26 have portions 26a at their upper ends which may be of metal secured thereto and said portions 26a respectively extend upwardly through the recesses 25d and are provided with small cylindrical projections 26b fitting into similarly shaped recesses 25e in portions 25b. Members 26 can be swung about the axes of members 25e respectively. Portions 25b and 25c are also provided with mating recesses to receive the ends of screws 27 having enlarged portions 27a at their inner ends. Screws 27 extend to and are threaded in portions 28 rigidly secured to bar 14 at the ends thereof and said screws are provided at their outer ends with small hand wheels 27a. Portions 25b and 25c are connected by screws 30 and 31 extending through portions 25c and threaded into portions 25b respectively. It will be seen that by turning the wheels 27a, members 25 will be moved longitudinally of bar 14 and will thus move the members 26. Members 26 can also be swung about the axes of portions 26b. Bar 14 has secured thereto members 32 spaced longitudinally thereof which will be made of resilient material, said members being arcuate in form and arranged to fit about the outer end of the frame portions 10a. Members 32 have spaced inwardly extending projections 32a which will be disposed at each side of the frame portions 10a.

In operation the supporting member 14 and parts carried thereby will be attached to the frame of the spectacles 10 by separating the members 32 and then permitting them to move towards each other and clamp the frame members 10a. The members 32 will tightly hold the frames 10 and the lugs 32a will prevent any movement forwardly and rearwardly of said frames. With bar 14 thus supported upon the spectacles 10, the members 17 will be at the rear side of the spectacle lenses 11 or at the side nearest the wearer. Members 26 will be at the opposite side of the said lenses. By loosening screws 18 the members 17 can be swung about the axes of their portions 15e to dispose the same in the desired position. Members 17 will be clamped in adjusted position by tightening screws 18. When the driver looks through the portions 17, his eyes will be shielded from the glare of approaching headlights and the side of the road at his left-hand will be viewed through the members 17. The right-hand side of the road on which he is traveling will be viewed through the clear lenses 11 so that he can see the surface and edge of the road and any other object on the road. He is thus shielded from the glare of the headlights of an approaching vehicle and yet his total vision is not dimmed.

It has been found in practice that in having just the members 17 that a sharp dividing line of vision is not formed by the edge 17a in relation to the lenses of spectacles carrying said device as seen by the wearer. Said edge 17a has sort of a blurred effect. To correct this the members 26 are provided. Members 26 can be swung about the axes of their portions 26b and the inner edge thereof brought into the desired relation with the edge 17a of the adjacent member 17. Members 26 can be held in the desired position by tightening the screw 30. The adjacent straight edges of members 17 and 26 can be aligned to form a very sharp dividing line in relation to the lenses of the spectacles as seen by the wearer so that there is a sharp division between what is seen through the portions 17 and what is seen through the clear lenses 11. Members 17 and 26 can of course be moved bodily by turning the screws 22 and 27.

In Figs. 7 and 8 the bar 14 is shown which will carry the members 17 and 26 with the identical structure shown in Figs. 1 to 6. In the form shown in Figs. 7 and 8, portions 32 are omitted. Bar 14 is provided with a nosepiece 35 and is provided adjacent each end with the brackets 36 having lugs 36a to which are pivoted the bows 38. The structure shown in Figs. 7 and 8 can thus be worn by the wearer with the bows 38 as usual extending about the ears and the nosepiece 35 resting upon the nose. The form shown in Figs. 7 and 8 can be worn by a person who does not ordinarily use eye glasses or spectacles. The portions 17 and 26 will be disposed in front of the eyes of the wearer and these parts will be adjusted as hereinafter described.

To adjust the device, the member 17 in front of the left eye will be adjusted by its adjusting screw 20 so that its straight edge is brought into line with the left shoulder line of the road. The wearer's head will then be turned to the right until said edge is brought parallel with the center line of the road with both eyes open. The outer edge of the second member 17 is now adjusted so that it is parallel with the straight edge of the member 17 and gives a clear view. Then member 26 is adjusted by its adjusting screw 27 until its outer edge is in position to give a clear sharp line of vision along the center line or edge of the road. If only the member 17 is used, there is a rather fuzzy effect or edge along the straight edge thereof. This is eliminated by bringing the member 26 into proper position.

When the wearer is driving and there is no car approaching, the wearer looks through the clear part of the lens and sees the entire road as usual. Should a car approach and the headlights thereof cause a glare, the wearer turns his head slightly to the right until the edge 17a of the left-hand member 17 is parallel with the center line of the road so that the right-hand side of the road is seen through the clear part of the device but the left-hand side will be seen through the member 17. The glare of the approaching car is thus eliminated but at the same time the driver can see the right-hand side of the road as usual. As soon as the car which approached has passed, the wearer will turn his head again slightly to the left or back to normal position, thereby again giving a full clear view of the entire road. It will be understood that members 17 and 26 are on the left side of the spectacle lens and their straight edges are on the right-hand side thereof because the wearer is driving on the right-hand side of the road. If the wearer were driving on the left-hand side of the road, as in England or on the Continent, said members and edges would be at the opposite sides respectively.

From the above description it will be seen that I have provided a simple, novel and efficient device for shielding the driver of an automobile from the glare of the headlights of an approaching vehicle. As above described, the portion of the vision of the driver viewing the right-hand side of the road when a car is approaching with glaring lights and the driver has turned his head as described, is not dimmed or affected, and this right-hand side of the road and objects thereon can be seen with a clear vision as usual. It has been found that where lenses are used which are entirely semi-transparent and the entire vision of the driver is dimmed, accidents frequently happen because the driver does not perfectly see the side of the road on which he is driving. Colored lenses often give the road an unnatural appearance. With the present device the driver normally sees the whole road with clear vision, and only when a car is approaching with glaring headlights is the vision of the left-hand side of the road dimmed. The adjusting screws are provided so that a quick and very fine and accurate adjustment of both members 17 and 26 can be made. The edges of members 17 and 26 can be quickly brought to the desired positions. The device can be easily made, and as shown and described can be either attached to eye glasses already worn or can be used independently of such eye glasses or spectacles. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A glare-shielding device used in connection with a pair of spectacles having lenses therein having in combination, a member of semi-transparent sheet material having an area equal to a substantial portion of a spectacle lens and having a straight edge at one side, a second member made of semi-transparent sheet material and having a small transverse dimension, said second member being spaced a short distance forwardly from said first mentioned member and having a straight edge adjacent said straight edge, said straight edges being adapted to be aligned whereby a sharp dividing line is provided between what is seen by the wearer through the clear lenses and what is seen by the wearer through the semi-transparent members and means for supporting said members in front of an eye of the wearer with said straight edges at the side of said members corresponding to the side of the road being driven on by said wearer.

2. The structure set forth in claim 1, and means for moving one of said members to bring said edges into the desired position to produce said sharp dividing line.

3. The structure set forth in claim 1, said first mentioned member being of segmental form.

4. The structure set forth in claim 1, and means for swinging one of said members about an axis adjacent one end thereof to bring said straight edges into the desired positions.

5. A glare-shielding device having in combination, a supporting member, a second member of semi-transparent sheet material and having a straight edge at one side and mounted on said supporting member for swinging movement in its plane, a third bar-like member of small width and made of semi-transparent sheet material having a straight edge and mounted for swinging movement on said supporting member, said third member being spaced in a forwardly direction from said second member, means for swinging said third member to bring its straight edge into the desired relation to said straight edge of said second member to form a common dividing line in relation to the vision of the wearer as to what is seen through said members and as to what is seen to one side thereof, and means for supporting said supporting member upon the wearer with said second and third members in front of the left-hand part of the eye of the wearer, said straight edges being at the right-hand side of said second and third members.

6. The structure set forth in claim 5, said supporting member having resilient arcuate members thereon adapted to engage and be supported on the frame of a pair of spectacles.

7. A glare-shielding device having in combination, an elongated supporting member, a second member disposed at one side thereof and arranged for sliding movement against and at one side of said supporting member and longitudinally thereof, a third member made of semi-transparent sheet material depending from said second member and pivotally connected thereto for swinging movement about an axis substantially perpendicular to the plane thereof, means on said supporting member for moving said second and third members longitudinally thereof, means for holding said third member in different positions about said axis, and means for supporting said supporting member on the wearer with said second member disposed in front of one of the eyes of the wearer.

8. The structure set forth in claim 7, said first mentioned means comprising a nut on said supporting member, a screw attached to said second member, said screw having a hand wheel for turning the same.

9. The structure set forth in claim 7, a fourth member at the opposite side of said supporting member arranged for sliding movement against and longitudinally of said supporting member, a fifth member of semi-transparent sheet material and of bar-like form pivotally connected at its upper end to said fourth member for swinging movement about an axis substantially perpendicular to its plane, means on said supporting member for moving said fourth and fifth members longitudinally of said supporting member, said third and fifth members respectively having straight edges at the right-hand sides thereof respectively, and means for holding said fifth member in different positions about said second mentioned axis.

10. The structure set forth in claim 9, said first mentioned means comprising a nut on said supporting member, a screw threaded in said nut and attached to said fourth member, said screw having a hand wheel for turning the same.

11. A glare-shielding device having in combination, an elongated bar-like supporting member, a second member slidable longitudinally of and against said supporting member and comprising two portions, a third member of semi-transparent sheet material having a portion at its upper end disposed between said portions and held for swinging movement about an axis substantially perpendicular to the plane thereof, means for clamping said third member between said first mentioned portions to hold the same in the desired position about said axis, and means for supporting said supporting member on the wearer with said third member in front of an eye of the wearer.

12. A glare-shielding device having in combination, a supporting member, a second member of semi-transparent sheet material pivotally connected at one end to said supporting member, said second member being of substantially segmental shape thus having a straight edge at one side, means on said supporting member for swinging said second member about its pivotal connection to said supporting member, means for supporting said supporting member with said second member in front of a portion of an eye of the wearer with said straight edge at the right-hand side thereof, a third member of semi-transparent sheet material having a narrow width and a straight edge at one side, said third member being spaced from said second member a slight distance in a direction substantially perpendicular to the plane of said second member, and means on said supporting member for swinging said third member about its pivotal connection with said supporting member to bring said straight edges into alignment.

13. A glare-shielding device having in combination, a member of semi-transparent sheet material having an area equal to a substantial portion of an ordinary spectacle lens and having a straight edge at one side, a member spaced a short distance from said member in a direction substantially perpendicular to the plane of said member and having a straight edge, means for positioning said straight edges to bring said edges into a position to give a sharp dividing line between what is seen in the wearer's unobstructed vision and through said member, and means for supporting said member and first mentioned means in front of the eye of the wearer with said straight edges at the side thereof corresponding to the side of the road being driven on by said wearer.

MATHEW H. THORNTON.

References Cited in the file of this patent

FOREIGN PATENTS

| Number | Country | Date |
|---|---|---|
| 218,521 | Great Britain | July 10, 1924 |